Dec. 30, 1969   A. R. ALLAN, JR   3,486,311
FILTER BANK ASSEMBLY
Filed Dec. 22, 1967   2 Sheets-Sheet 1
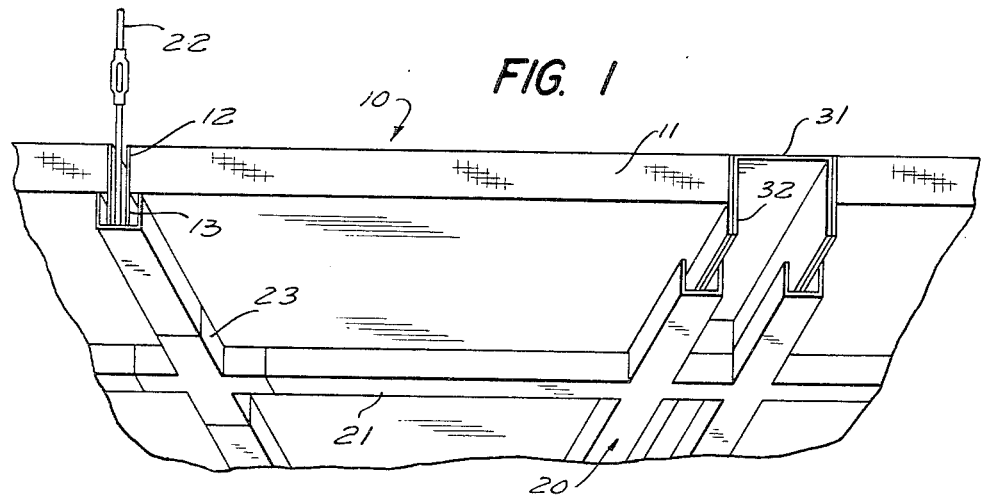
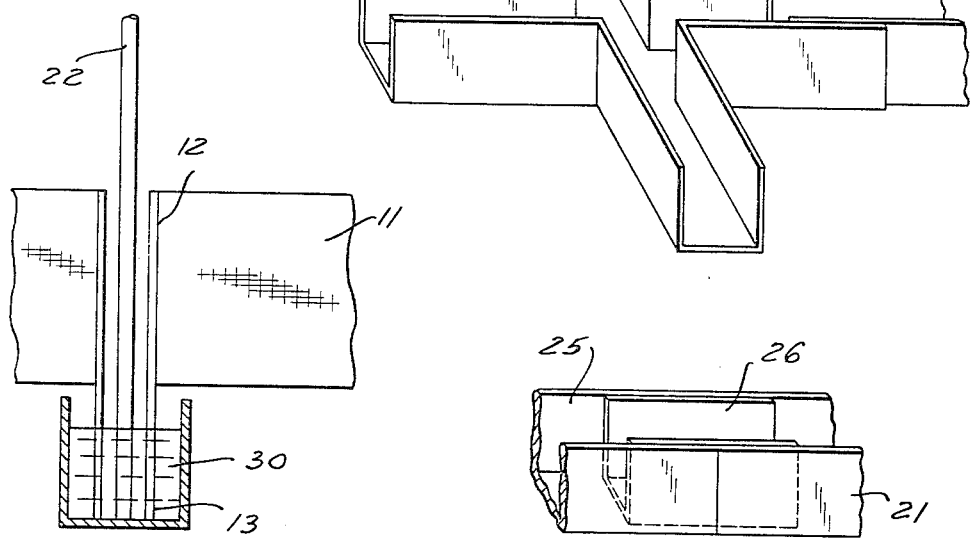
INVENTOR
ADRIAN R. ALLAN, JR.
BY
Kane, Dalimer, Kane, Sullivan + Smith
ATTORNEYS

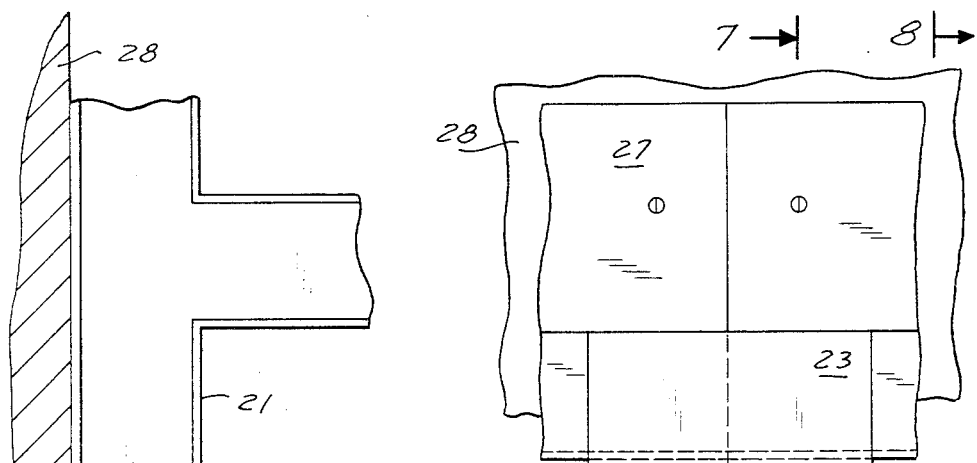
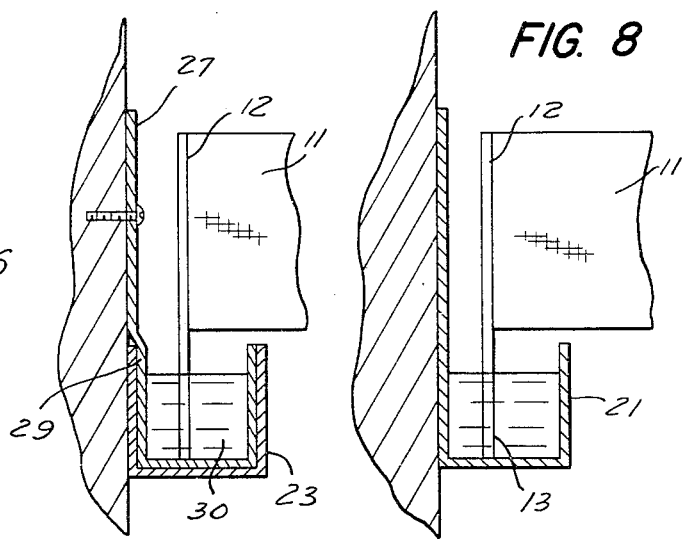

United States Patent Office 3,486,311
Patented Dec. 30, 1969

3,486,311
FILTER BANK ASSEMBLY
Adrian R. Allan, Jr., Remsenburg, N.Y., assignor to Flanders Filters Incorporated, Riverhead, N.Y., a corporation of New York
Filed Dec. 22, 1967, Ser. No. 692,986
Int. Cl. B01d 29/04
U.S. Cl. 55—355                            7 Claims

ABSTRACT OF THE DISCLOSURE

A filter bank assembly for filtering air prior to its entry into a clean room which comprises a supporting latticework of interconnected U-shaped channels having their open sides directed upwardly, the channels having a liquid positioned therein. A plurality of filter modules are supported by the latticework and have frame edges designed to rest in the open sides of the channels such that leakage of air between the modules and the latticework is precluded by the liquid.

BACKGROUND OF THE INVENTION

This invention relates to a system for supplying virtually dust-free and virtually bacteria-free air to critical production or laboratory areas such as clean or white rooms.

For precise control of clean room air, it is often advantageous to cover the entire area of the ceiling with a bank of filter modules. The circulating air is introduced under pressure above the modules such that it must pass through the filters prior to entry into the clean area of the room. The large area of the bank permits a reduced air velocity through the filters with an attendant decrease in filter resistance and the amount of power needed to circulate the air. Also, smooth and uniform air flow throughout the room is achieved. The air may then exhaust through appropriate ducts adjacent the floor to the atmosphere or it may be recirculated by conventional blowers to the inlet duct above the modules.

Air filters having extremely high efficiencies on submicron sized particles have been developed for use in applications of this type and are generally called "absolute" or "HEPA" filters in the industry. Suitable filter media may include glass, ceramic or cellulose-asbestos papers which have the ability to remove over 90% of sub-micron sized particles from the air. The paper is generally folded in accordion fashion to form a filter pack which is mounted and sealed in a supporting rigid frame. A further more particular description of "absolute" filters may be obtained by reference to various specifications published by the prime contractors to the Atomic Energy Commission. For example, reference may be made to Specification #07-AZ-1c, Class II, published by the Union Carbide Corporation, Union Carbide Nuclear Division.

In conventional filter bank construction, the individual filter modules are mounted in surrounding metal holding frames which are designed to be fastened together, either by riveting or welding to form the supporting structure. When a bank is constructed more than four filters high or four filters wide, it is general practice to also attach structural steel supports. To reduce air leakage between adjacent holding frames, a coating of mastic sealant is often applied. Also, a gasket of neoprene rubber or other similar material is generally positioned between the edge or flange face of the filter module frame and an inwardly turned flange on the face of the holding frame to further reduce leakage.

Slight unfiltered air leaks between adjacent holding frames, and between the frames of the modules and the holding frames have generally existed in many "absolute" filter banks in spite of the above precautions taken to prevent them. In many industrial applications these leaks are of little consequence since a high degree of purity is not required. However, even the slightest leaks are of significant interest when the units are used in certain areas such as clean or white rooms, hospitals, and in the food and pharmaceutical industries.

It is therefore an object of the present invention to provide a filter bank wherein unfiltered air leakage through the filter bank is entirely eliminated. More particularly, it is an object of this invention to provide a filter bank structure which does not rely on mastic sealant or gaskets to prevent unfiltered air leakage.

It is a further object of this invention to provide a structural system for supporting a filter bank which is inexpensive to manufacture and easy to install. An additional object is to provide a system which permits the easy removal and replacement of the individual filters.

In a broad sense, this invention relates to a ceiling for filtering the air as it enters a clean room which comprises a latticework of interconnected U-shaped channels having their open sides directed upwardly, and a plurality of filter modules positioned on the latticework to cover the open areas thereof. Each of the filter modules comprises a filter pack and a surrounding frame, the frame having a continuous vertically disposed edge adapted to rest in the open upper side of the channels. The channels have a liquid positioned therein to completely block the passage of air.

Additional objects and advantages of the present invention will become apparent to those skilled in the art from the following detailed description.

BRIEF DESCRIPTION OF THE DRAWINGS

FIG. 1 is a fragmentary perspective view, partly in section, showing the filter modules and supporting channels in assembled relationship;

FIG. 2 is a side elevational view, partly in section, showing the manner in which the filter frames are positioned in the supporting channels;

FIG. 3 is a perspective view of a typical connecting joint;

FIG. 4 is a perspective view illustrating an alternate form of connecting joint;

FIG. 5 is a fragmentary plan view, looking down at the connection of the channels to the wall;

FIG. 6 is a fragmentary side elevational view taken along the line 6—6 of FIG. 5;

FIG. 7 is a sectional view taken along the line 7—7 of FIG. 6 and additionally showing a filter module positioned in the channel;

FIG. 8 is a view similar to FIG. 6 but taken along the lines 8—8 of FIG. 6.

DESCRIPTION OF THE PREFERRED EMBODIMENT

Referring to the drawings, FIG. 1 shows the general manner in which the filter modules 10 are supported by latticework 20.

The modules 10 comprise a filter pack 11 of filtering material which, in the preferred embodiment, is made up of filter paper folded in accordion fashion. A filter frame 12 surrounds and supports the pack in a conventional manner. The filter frame may be formed from any suitable material such as metal or plastic, and includes a continuous vertically disposed extension or edge 13 which projects beyond the bottom surface of the filter pack for the purposes hereinafter described.

The latticework 20 is made up of a plurality of interconnected U-shaped channels 21 having their open sides directed upwardly. The latticework may be designed to cover the entire room and is supported from the permanent ceiling by a number of tie rods 22 which are suitably connected in the open side of the channels.

The individual channels 21 are joined to each other in such a manner that their open sides are in direct communication. This is necessary since the channels are designed to receive the edges 13 of the modules and thus there can be no bulkheads at the channel joints. The channels may be joined in a number of ways, such as by cementing or welding the abutting ends. As an alternative, a connecting joint 23 may be provided which is designed to receive and retain the ends of the channels. The joint 23 may be variously designed to receive, for example, four channels as shown in FIG. 3, or two channels as shown in FIGS. 5–7. A suitable adhesive may be used to secure and seal each channel in the joint or a mechanical means such as a bolt or rivet may be employed to effect or supplement the connection. The joint may be made from a resilient material such as neoprene rubber, thus further serving as an expansion joint which may be desirable if the room is subject to temperature variation.

A further form of connecting joint is shown in FIG. 4. The joint 25 (only a portion of which is illustrated) is generally similar to the joint 23 as seen in FIG. 3, but is designed to be joined to the ends of the channels 21 without overlap. The joint 25 may be joined by a splice plate 26 which is suitably welded or cemented in place to effect a sealed connection between the two members. The splice place 26 could also be used to directly join two channels in end-to-end abutting relation without the use of a connecting joint.

An example of the manner in which the latticework may be joined to the side walls of the clean room is illustrated in FIGS. 5–8. For this purpose the channel 21 includes a continuous side flange 27 which is adapted to be mechanically fastened to the wall 28. If desired, an adhesive may be positioned between the flange and wall to further insure an air-tight joint. Also, if thermal expansion and contraction is likely to be a problem, the apertures in the flange 27 for receiving the mechanical fasteners (which are screws in the drawing) may be slightly slotted to permit a degree of relative movement between the flange and wall. The ends of adjacent channels may be joined in any suitable manner such as by cementing, welding, or the use of either of the illustrated joints 23 or 25 which may be connected as described above. If joint 23 is used, the channel may include an indentation as shown at 29 to provide a clearance for the joint along the back side of the channel.

In order to insure an air-tight seal between the edges 13 of the modules and the channels 21, a liquid 30 may be placed in the channels as illustrated in FIGS. 2 and 7–8. As will be apparent, the liquid will absolutely preclude any air from entering the room by leaking under the frame edge 13.

While a great many liquids are suitable for use as the sealing medium, it is desirable to select a liquid which has a high consistency or resistance to deformation. In many applications the introduction of air above the filter modules will cause a pressure differential of several inches of water on opposite sides of the edge 13. The use of a liquid having a low consistency would thus require high sides on the channels. Several non-Newtonian hydrocarbon fluid such as the Parmo products which have a consistency similar to household petrolatum, and which are sold by the Humble Oil and Refining Company, have been found to be very satisfactory for this purpose. These liquids are also desirable in that they are generally non-corrosive.

It is also contemplated that a liquid which hardens or sets after introduction into the channels may be utilized. Examples of such materials would be a thermoplastic resin such as polystyrene, a thermosetting resin such as epoxy, or a low melting point metal alloy. The use of a liquid of this type is desirable since the latticework would not have to remain level after the liquid has set.

The term "liquid" as used in this application is thus intended to encompass any material which may be poured into the channels to effect a seal between the module edges and the channels.

Where the latticework is designed to cover the entire ceiling of the room, it may be desirable to position a number of panels 31 on the structure for supporting a light fixture or other appliance. The panels 31 have depending side edges 32 which are designed to enter the open sides of the channels in a manner similar to the edges 13 of the modules 10 such that there can be no leakage.

In installing the filter bank of this invention, it is generally preferable to initially secure the channels to the side walls completely around the periphery of the room and somewhat below the permanent ceiling. The latticework may then be assemled by joining channels of suitable length until the ceiling is entirely covered. The assembly is completed by filling the channels with a suitable liquid and positioning the filter modules on the latticework such that their edges rest in the channels.

The channels and connecting joints may be manufactured in various standard lengths and configurations such that a room of any size or shape may be easily covered. Also, the openings in the latticework can be easily designed for use with modules or panels of any conventional shape. A rectangular opening is to be preferred however, since the modules may then be easily removed or installed simply by tilting and passing them through the opening in the latticework.

Although the filter bank assembly of this invention has primarily been illustrated as an overhead ceiling, it should be understood that the structure could easily be used as a vertical wall where the above described hardening liquids are used as the sealant in the channels.

I claim:

1. An assembly for filtering the air entering a room comprising:
   a latticework of interconnected U-shaped channels having their open sides directed upwardly and defining a plurality of rectangular open areas, said channels having a liquid positioned therein, all of said channels being constructed and arranged in liquid communication with one another with no bulkheads therebetween,
   a plurality of rectangular absolute filter elements positioned on said latticework to cover said open areas thereof, each of said filter elements comprising a filter pack and a surrounding frame, said frame having a continuous vertically disposed extension projecting downward and resting in the open upper side of said channels, the lower edge of said extension being disposed below the upper surface of said liquid to form a seal therewith, each frame having a portion of its extension disposed opposite the corresponding extension of the adjacent frame with said opposing extensions being disposed in the same channel.

2. An assembly as defined in claim 1 wherein said latticework is substantially level and said liquid is of a relatively high consistency.

3. An assembly as defined in claim 1 wherein said latticework is not level and said liquid has set.

4. A system for filtering the air entering a room comprising:
   a latticework of interconnected U-shaped channels having their open sides directed upwardly and defining a plurality of rectangular open areas, all of said channels being constructed and arranged in liquid communication with one another with no bulkheads therebetween,
   means for supporting said latticework from a permanent ceiling, said latticework being disposed below said ceiling to define an area therebetween,
   a plurality of rectangular absolute filter modules positioned on said latticework to cover said open areas thereof, each of said filter modules comprising a filter pack and a surrounding frame, said frame having a continuous vertically disposed extension adapted to rest along the bottom in the open upper side of said channels, each frame having a portion of its extension disposed opposite the corresponding extension of the adjacent frame with said opposing extensions being disposed in the same channel, means to introduce air under pressure to the area between said latticework and said permanent ceiling, said channels being constructed and arranged to hold a sealing liquid to prevent the passage of air between said filter frames and said channels, and means to close the periphery of said latticework to the passage of air and for constraining all of the air introduced to said area to pass through said filter modules.

5. A system as defined in claim 4 further including a panel adapted to support an appliance, said panel having continuous depending extension adapted to rest in the upper side of said channels.

6. A system as defined in claim 4 wherein the interconnected U-shaped channels are joined to each other by means of a resilient U-shaped connecting joint.

7. A system as defined in claim 4 wherein the interconnected U-shaped channels are joined in end-to-end abutting relation and are secured together by means of splice plates which are positioned in the open upper side of said channels.

References Cited

UNITED STATES PATENTS

| | | | |
|---|---|---|---|
| 686,813 | 11/1901 | Learned | 55—355 X |
| 2,291,220 | 7/1942 | Germonprez | 98—33 |
| 2,732,028 | 1/1956 | Coulter | 55—355 X |
| 2,963,751 | 12/1960 | Mancini | 52—484 |
| 3,216,183 | 11/1965 | Larsson | 55—494 X |
| 3,277,624 | 10/1966 | Cornell | 52—484 |
| 3,321,877 | 5/1967 | Alexieff | 52—144 |
| 3,325,954 | 6/1967 | Olson | 52—303 |
| 3,350,862 | 11/1967 | Nutting | 55—493 |
| 3,360,910 | 1/1968 | Soltis | 55—509 |
| 3,415,027 | 12/1968 | Snyder et al. | 52—650 X |

FOREIGN PATENTS

| | | |
|---|---|---|
| 42,622 | 5/1933 | France. |
| 476,310 | 12/1937 | Great Britain. |
| 833,307 | 4/1960 | Great Britain. |

OTHER REFERENCES

Crane, V.G., "Design Techniques for Industrial Clean Rooms," Air Conditioning, Heating and Ventilating, December 1963, pp. 57–63.

HARRY B. THORNTON, Primary Examiner

D. E. TALBERT, JR., Assistant Examiner

U.S. Cl. X.R.

52—484, 494; 55—385, 483, 484, 494, 502; 98—32, 40; 248—200